US007878050B2

(12) United States Patent
Cueto

(10) Patent No.: US 7,878,050 B2
(45) Date of Patent: Feb. 1, 2011

(54) METHOD AND SYSTEM FOR TESTING A FUEL INJECTOR

(76) Inventor: Omar Cueto, 5323 Lenox Ave., Jacksonville, FL (US) 32205

(*) Notice: Subject to any disclaimer, the term of this patent is extended or adjusted under 35 U.S.C. 154(b) by 278 days.

(21) Appl. No.: 12/117,750

(22) Filed: May 9, 2008

(65) Prior Publication Data

US 2009/0279087 A1 Nov. 12, 2009

(51) Int. Cl.
*G01M 15/09* (2006.01)

(52) U.S. Cl. ................................ 73/114.48; 73/114.51

(58) Field of Classification Search ............. 73/114.45, 73/114.46, 114.47, 114.48, 114.49, 114.51
See application file for complete search history.

(56) References Cited

U.S. PATENT DOCUMENTS 6,532,809 B2 * 3/2003 Robinson ................. 73/114.45
6,817,233 B2 * 11/2004 Toiyama et al. .......... 73/114.48
7,197,918 B2 * 4/2007 Shen ....................... 73/114.51
7,472,586 B2 * 1/2009 Niimi et al. .............. 73/114.42
2002/0174717 A1 * 11/2002 Toiyama et al. ............ 73/118.1
2005/0034514 A1 * 2/2005 Shen ........................ 73/119 A
2005/0150271 A1 * 7/2005 Klopfer et al. ............... 73/1.36
2006/0101922 A1 * 5/2006 Niimi et al. .............. 73/861.57
2007/0240500 A1 * 10/2007 Pollard et al. ............. 73/119 A
2009/0007695 A1 * 1/2009 Araki et al. .............. 73/861.47
2009/0114035 A1 * 5/2009 Lehnert ....................... 73/861

* cited by examiner

*Primary Examiner*—Eric S McCall
(74) *Attorney, Agent, or Firm*—Rogers Towers, P.A.; Stephen E. Kelly; Thomas C. Saitta

(57) ABSTRACT

Disclosed is both an apparatus and method for quantifying an injection event of a fuel injector, including both multiple pulse and single pulse injection events. Typically, the fuel injector is a common rail injector. The apparatus includes a pressure chamber for isolating a portion of the injection pressure for reducing pressure waves and reflections which can create "noise" in the detection of an injection pressure. The invention further includes determining the precise start and end times of injection using cavitation created by the injection event.

26 Claims, 8 Drawing Sheets

METHOD AND SYSTEM FOR TESTING A FUEL INJECTOR

TECHNICAL FIELD

The present invention relates to an apparatus and method for measuring injected fuel. In greater detail, the present invention relates to a method and apparatus for determining the quantity and rate shape of injection by a fuel injector for testing the injector.

BACKGROUND

The development of multi-pulse common rail injection systems in which fuel injectors are actuated to provide pilot and/or post injections as well as the primary or main injection has prompted the need for new, end-of-the-line, functional test equipment that can measure the fuel injected by the fuel injector.

While positive displacement systems connected to a highly accurate electronic displacement measuring system are sufficiently accurate to measure multi-pulse common rail injection systems, they are typically very complex and expensive. Consequently, such positive displacement, piston type measurement systems, are not suitable for use in the manufacturing assembly line environment where numerous systems are required to test a significant number of fuel injectors.

Alternative methods to expensive positive displacement systems connected to highly accurate electronic displacement measuring systems have the advantage of being rugged and applicable to the manufacturing or remanufacturing line environment. However, such measurement systems are not designed to measure fueling in multi-pulse common rail injection systems. In particular, such measurement systems are not adapted to measure the amount of fuel injected during pilot and/or post injections, as well as the primary injection.

An example of an alternative method to positive displacement includes a common-rail fuel injection rate measurement system consisting of a pressure chamber with pressure sensors, an amplifier box, an output processing unit, a data processing unit, and a volumetric flow-meter. The system also includes a back pressure sensor, a temperature sensor, a back pressure relief valve, and a discharge valve.

However, such known systems require complex processing and filtering of captured sensor output to derive information regarding the fuel injection quantity, variation, and/or rate shape. Such filtering and complex processing is necessary to remove the noise in the acquired data caused by the fuel pressure pulses reflected within the system.

Unfortunately, developing such extensive filters and processing methods is expensive. Furthermore, filtering and processing sensor output can decrease the accuracy of the system since the quality of the filters and methods used to process the sensor data can render the results inaccurate. Often, the resolution of the apparatus is not able to resolve the microsecond difference between the twin rate peaks of a multi-pulse common rail injection system.

Therefore, what is needed is a testing apparatus and method which is relatively inexpensive and capable of rendering accurate readings in both single and multi-pulse common rail injection systems.

SUMMARY

The present invention comprises both an apparatus and method for quantifying an injection event including both multiple pulse and single pulse injection events. The apparatus includes a pressure chamber for isolating a portion of the injection pressure for reducing pressure waves and reflections which can create "noise" in the detection of an injection pressure.

A further embodiment includes determining the precise start of injection and end of injection for increased resolution for determining multiple pulse injection events. The start and stop time of the injection is determined by measuring the resulting cavitation created by the injection event. The apparatus and method are capable of providing a highly accurate profile of an injector's performance.

In greater detail, the present apparatus for testing fuel injectors includes a fixture assembly capable of receiving a fuel injector. A spray chamber is connected to the fixture for receiving the spray tip and containing fluid injected by the injector tip during an injection event when the injector is actuated. Connected to the spray chamber is a pressure chamber housing a pressure sensor. In a further embodiment there is also included a temperature sensor.

An isolating orifice is included in the present apparatus for regulating and restricting the flow of fluid from the spray chamber to the pressure chamber to greatly reduce noise when detecting a pressure reading. The isolating orifice may be a fixed orifice or a variable orifice. Such noise is typically caused by the swirling pressure waves and reflections associated with the injection event.

Finally, a flow meter is connected to the spray chamber to measure the quantity of fluid injected. The flow is of course measured as an average. Additionally included is a dampening assembly before the flow meter to dampen the flow fluctuations.

Additionally, the apparatus may include a bleed valve for allowing any air trapped within to be purged from the apparatus or pressure chamber before measurement begins. Furthermore, a valve assembly fluidly connected to the spray chamber and pressure chamber for closing the pressure chamber to the spray chamber may be provided. A computing device is included for receiving input from the sensors for providing injection information quantifying the injection event and resulting pulses.

In a further embodiment, the apparatus includes determining the start and stop times of injection. The apparatus comprises a fixture assembly for receiving a fuel injector and a spray chamber connected to the fixture for receiving the spray tip and the injected fluid. Connected to the spray chamber is a pressure chamber housing a pressure sensor receiving only a restricted portion of the fluid or flow in the spray chamber created by the injection. A flow meter is also connected to the spray chamber measuring the quantity of injected fluid.

The start and end times of the injection, including the single and multiple pulses of the injection event are determined by the detection of cavitation within the spray chamber. Fluid injected into the spray chamber creates cavitation. Cavitation is detected optically using a laser and an optical pickup (diode detector) operatively aligned with the laser for detecting the laser light.

The laser light is directed and shown into the spray chamber through an optical window mounted within a port opening of the spray chamber. Typically the window is formed from quartz, which permits the transmission of a wide range of laser wave lengths from the near infrared through the visible and into the near ultraviolet. The cavitation plume resulting from the injection both reflects/scatters and partially blocks the laser light. In the reflecting/scattering embodiment, the reflected/scattered laser light is detected by the optical pickup (diode detector) to determine when the injection begins and ends. In the partially blocked embodiment, the decrease in intensity of detected laser light determines the start time of the injection and the later detection of laser light signals the end time of injection.

A further embodiment includes the splitting of a single laser beam into two segments for calibrating the apparatus. A first split laser beam is directed to bypass the cavitation plume to provide a reference beam and a second split beam is directed towards the cavitation plume path.

All three of the described laser embodiments may be combined to analyze the signal variation of the intensity of the three segments or components (reflected/scattered, partially blocked and reference or calibration) of the laser beam when the injection begins and ends. The laser embodiments in one instance are directed to measuring the intensity of the detected laser light and not wavelength or frequency variations. The three described embodiments may also be further enhanced using polarized laser beams and the analysis thereof.

The invention further comprises a method of measuring an amount of fuel injected by a fuel injector. The method includes securing a fuel injector to a fixture assembly for capturing fuel injected by the fuel injector during an injection event. The flow of fuel into the pressure chamber from the spray chamber is restricted to reduce pressure waves and reflections in the detection of the pressure of the injected fuel. The method further includes measuring the flow or quantity of fuel injected. Finally, injection information is determined based upon the measured pressure and measured flow. In a further embodiment temperature is included in the determination of the injection information.

In an alternative embodiment, the method includes determining the start and end of injection by detecting cavitation within the spray chamber. Cavitation is determined by detecting fluctuations in the intensity of laser light detected. The injection may also be evaluated based upon the start and stop times of the injection, measured pressure and measured flow of the injection. In a further embodiment temperature is detected and included in the determination of the injection information.

DRAWINGS

Figure 2:
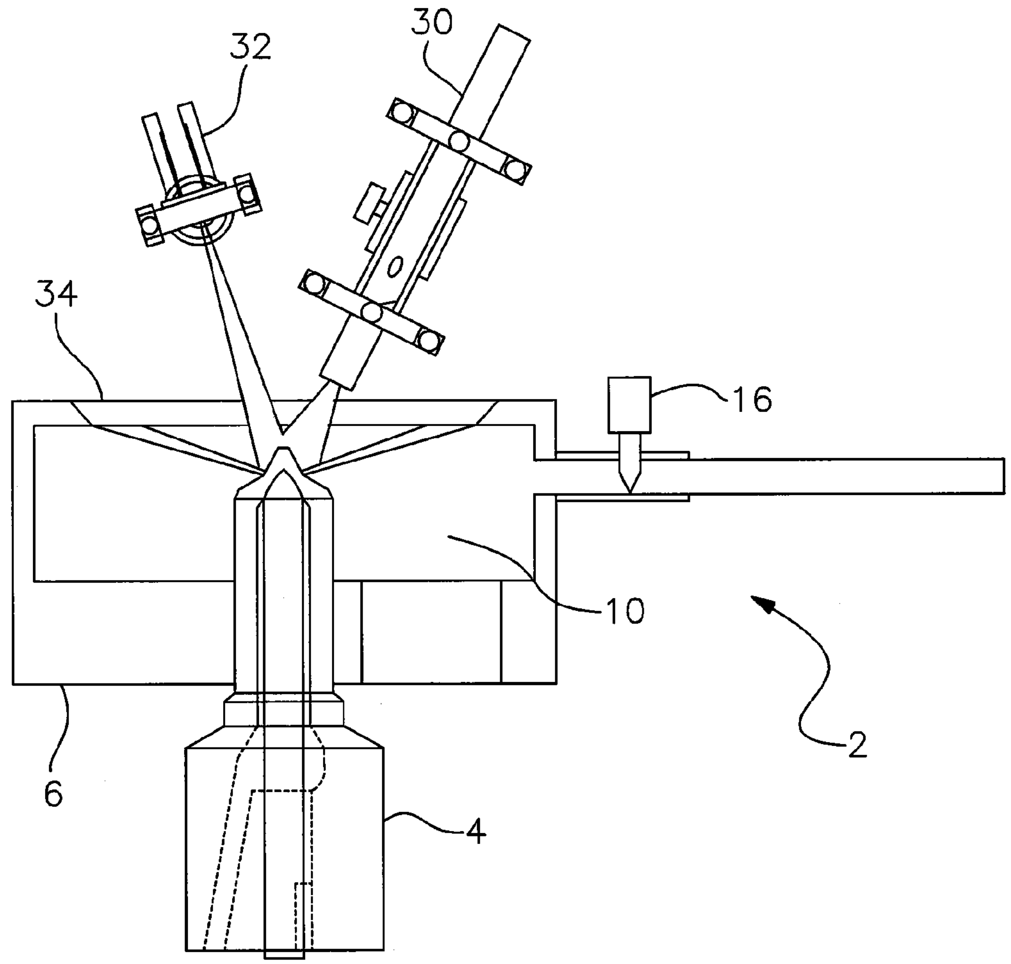
FIG. 2 is a depiction of an embodiment of the present apparatus for testing a fuel injector including a laser and an optical pickup (diode detector) for determining the start and end time of an injection by detecting a reflected/scattered laser beam light.
Figure 3:
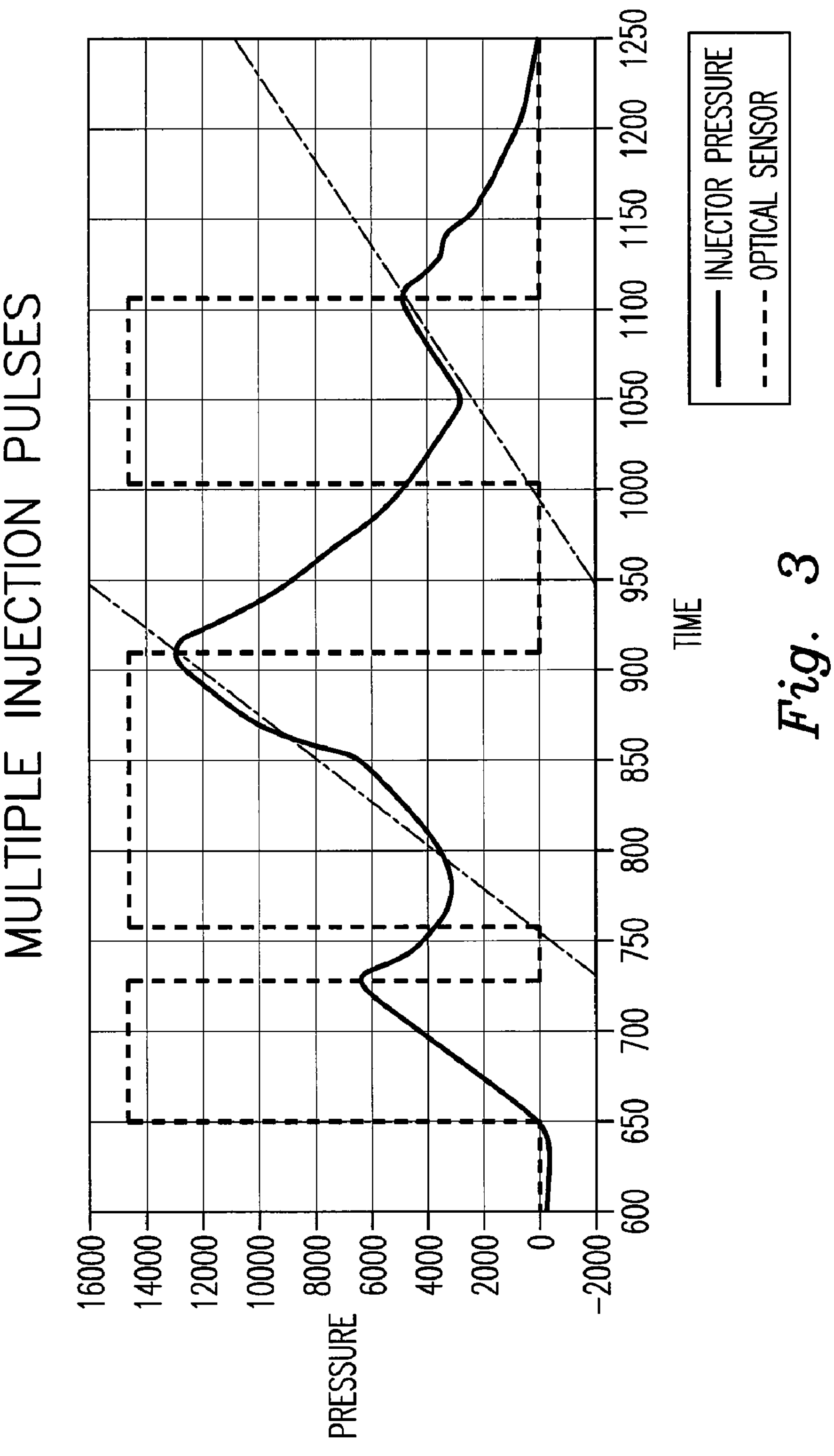
Figure 4:
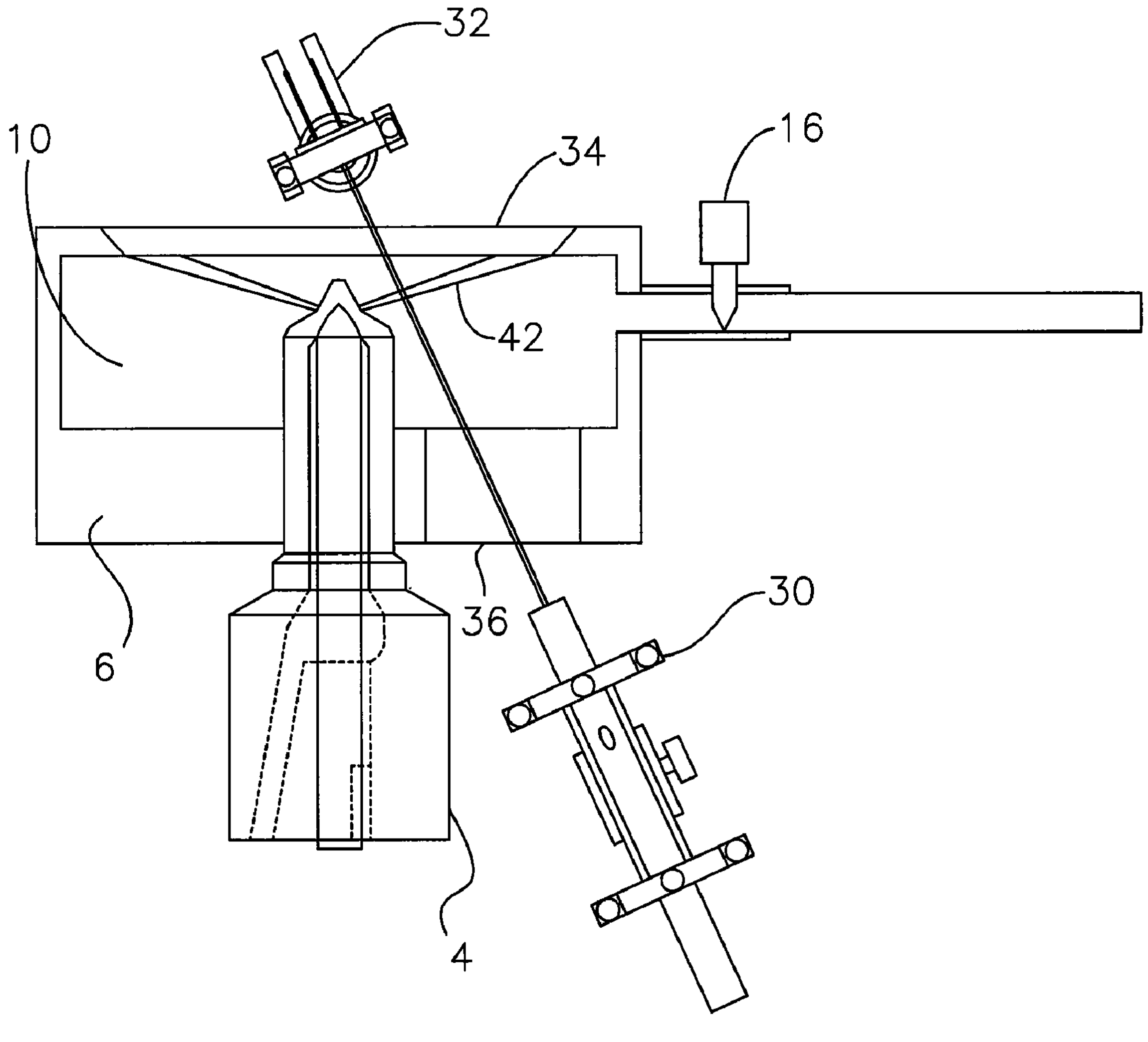
Figure 5:
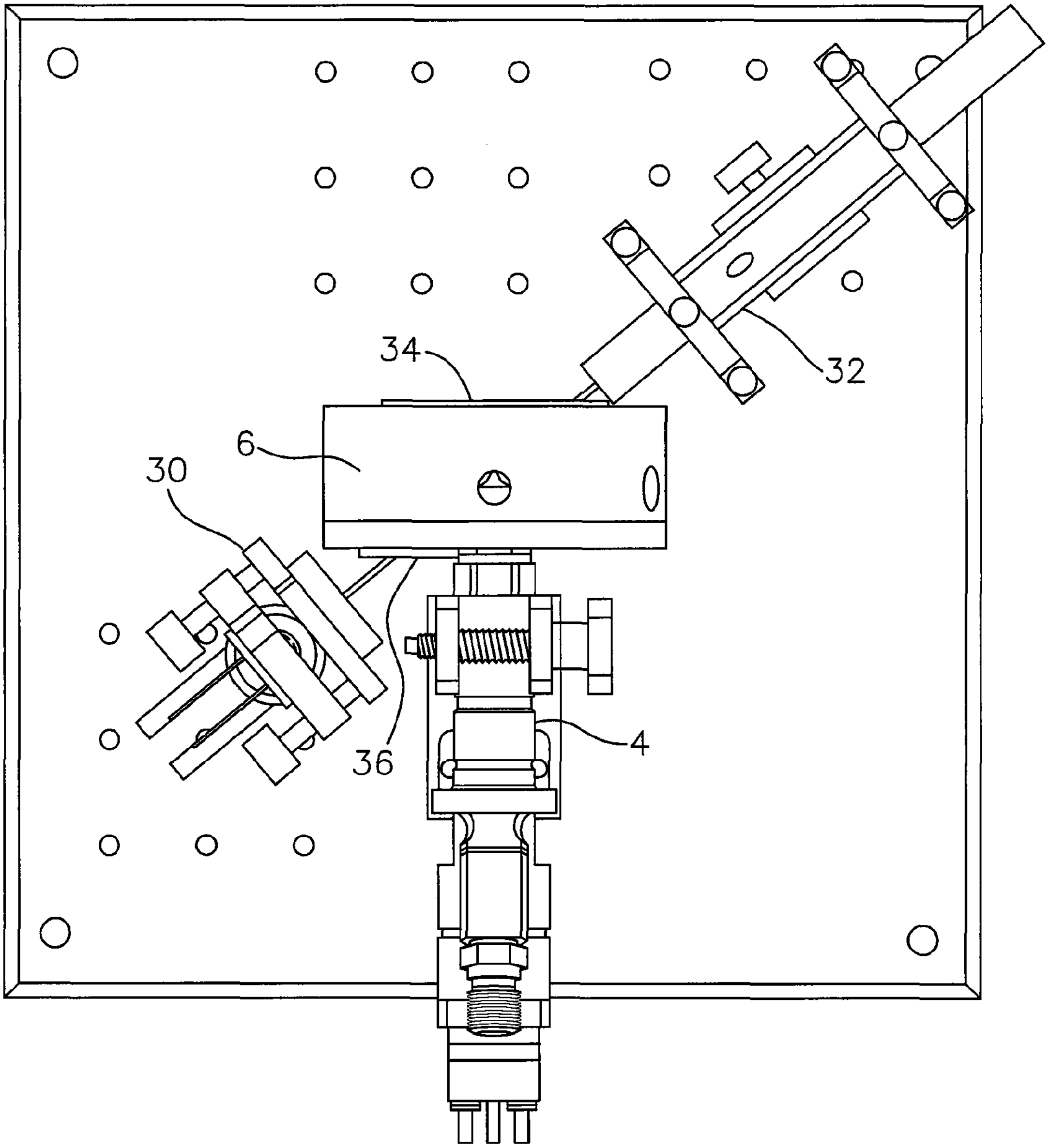
Figure 6:
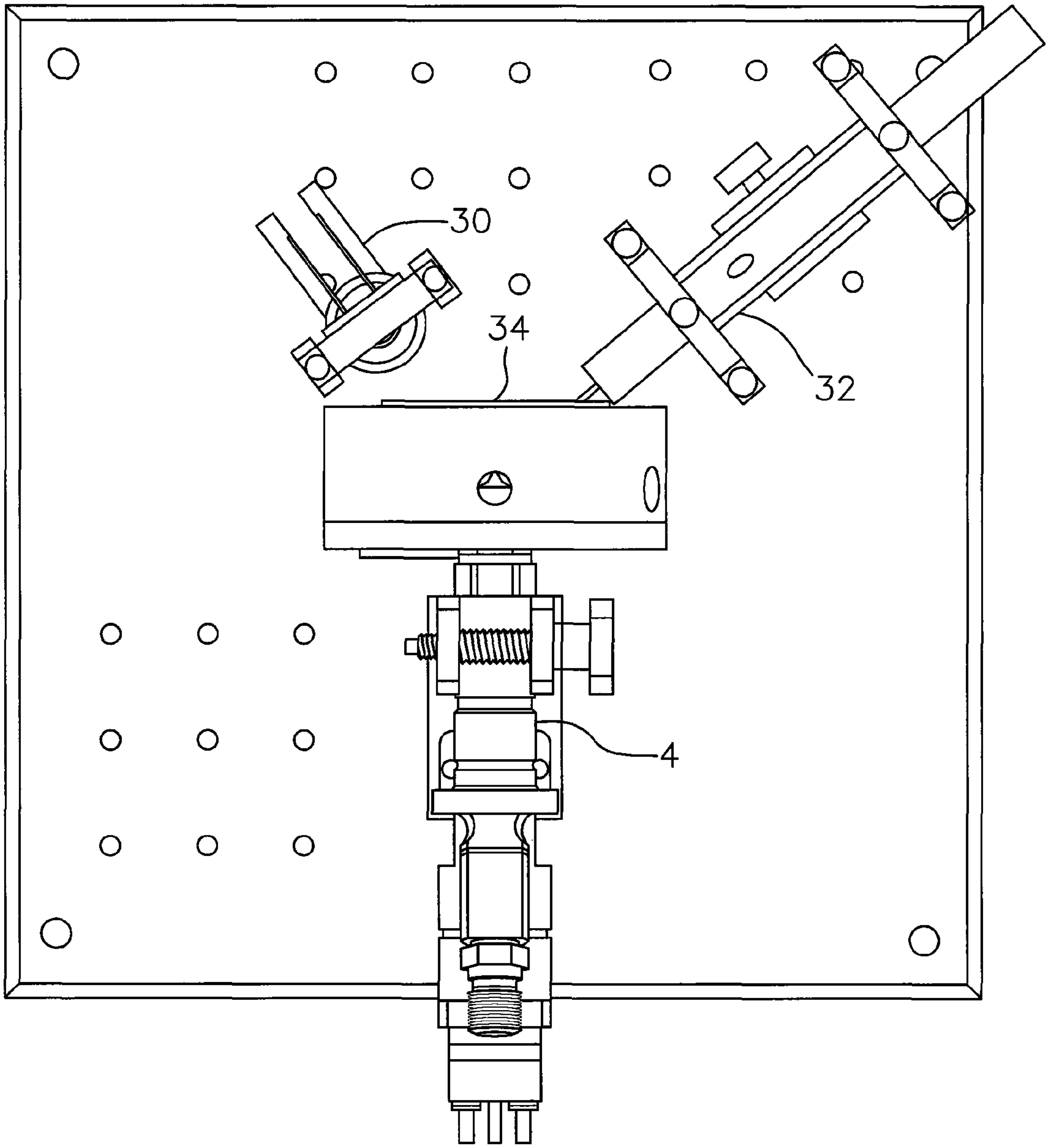
Figure 7:
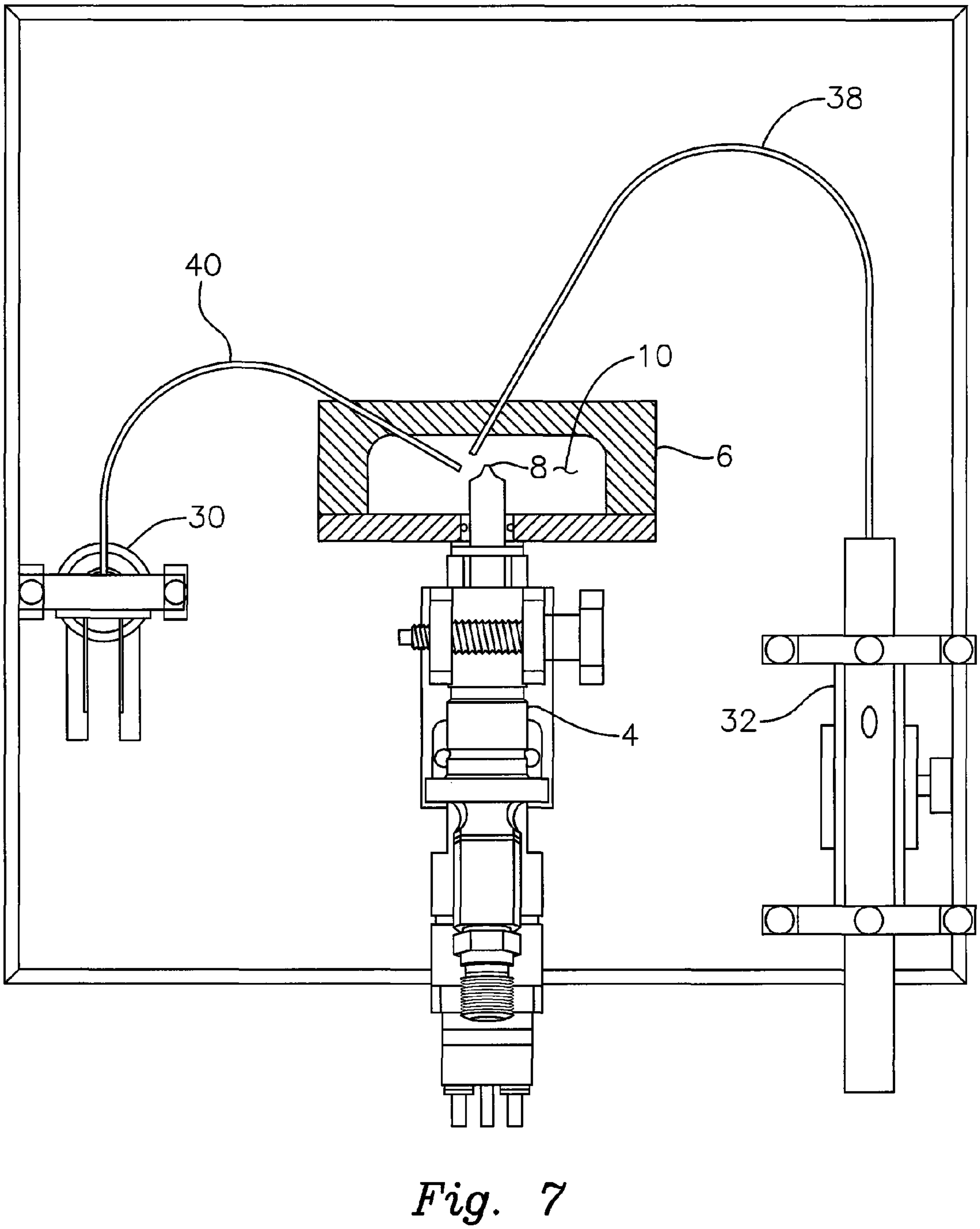
Figure 8:
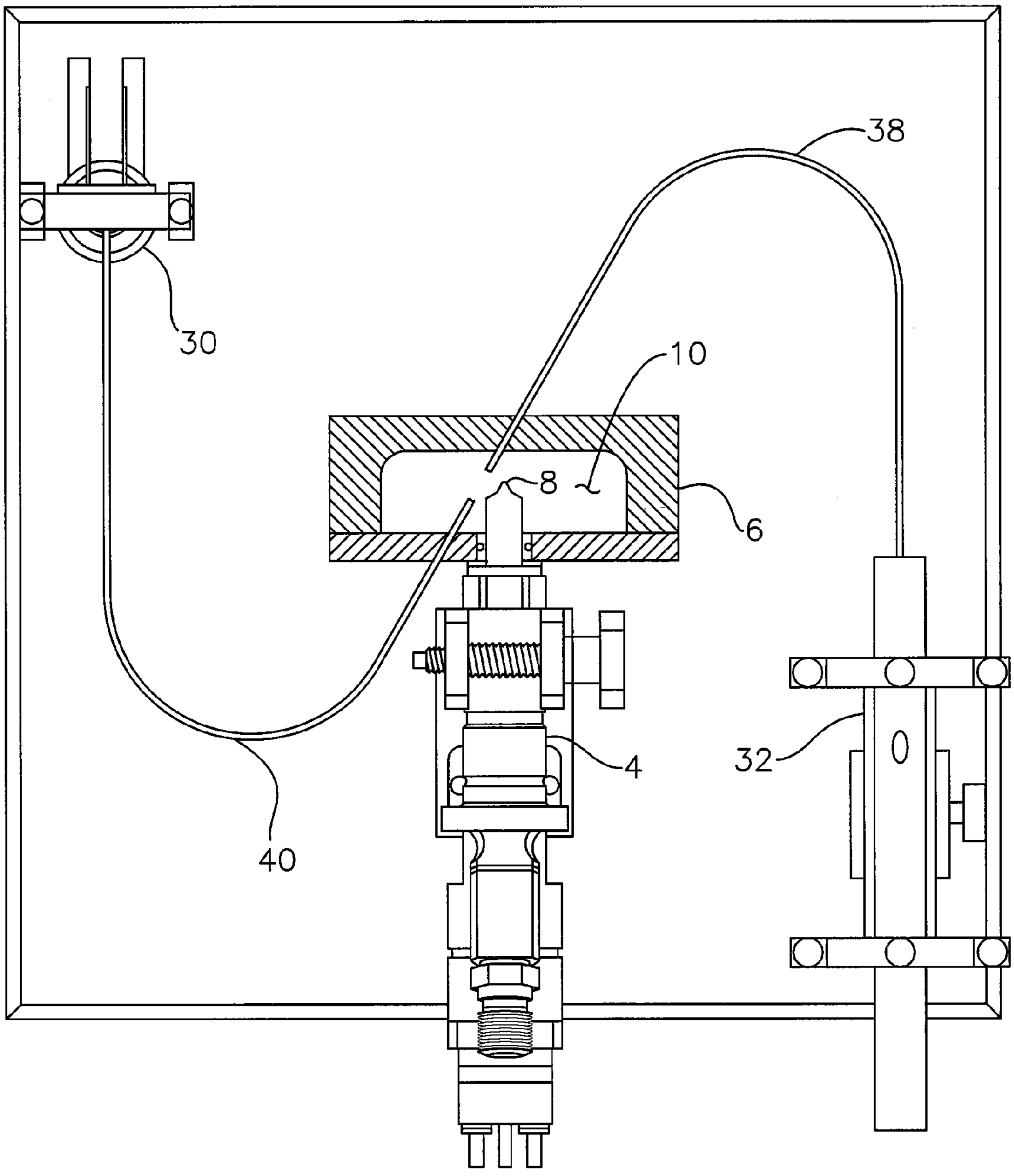

FIG. 3 depicts overlapping multiple injection pulses shown as solid lines and the optical pickup sensor or diode detector sensor of the present apparatus showing the start and stop times for injection as broken lines on the graph such that the slanted line going from the start of injection time to the peak of injector pressure can be used to extrapolate the rising pressure waveform to calculate volumetric flow rates;

FIG. 4 is a further illustration of the embodiment of the present apparatus for testing a fuel injector including a laser and an optical pickup (diode detector) for determining the start and end time of an injection wherein detecting a reduced intensity of the laser light indicates the presence of an injection and cavitation which partially blocks and interrupts the laser beam light;

FIG. 5 is an additional embodiment of the testing apparatus for a fuel injector of FIG. 4 including a laser and an optical pickup (diode detector) for determining the start and end time of an injection;

FIG. 6 is a further illustration of the testing apparatus for a fuel injector of FIG. 2 including a laser and an optical pickup (diode detector) for determining the start and end time of an injection by detecting a reflected/scattered laser beam light;

FIG. 7 illustrates the embodiment of the present apparatus for testing a fuel injector wherein the laser light is directed into the chamber via an optic fiber and a reflected light is detected using a second portion of the optic fiber; and FIG. 8 depicts the embodiment of the present apparatus for testing a fuel injector wherein the laser light is directed into the chamber via an optic fiber having a gap in the fiber aligned with the fuel plume wherein one portion of the optic fiber delivers the light and the other portion detects the light.

DETAILED DESCRIPTION

Disclosed is both an apparatus and method for quantifying an injection event including both multiple pulse and single pulse injection events. The apparatus includes a pressure chamber for isolating a portion of the injection event. By isolating the event, the apparatus reduces the pressure waves and reflections which can create "noise" in detecting the injection pressure. The apparatus may further include detecting the start and stop times of injection using an optical timing device based upon the opaque properties of cavitation.

While the present apparatus and method are especially advantageous when implemented to measure fuel injection quantity, variation, and/or rate of multi-pulse injections, such may also be used to measure the parameters of fuel injectors operable in a conventional, single injection pulse manner. As can be appreciated by one of ordinary skill in the art, multi-pulse common rail injection systems may be operated in a conventional manner to provide a single pulse injection. The present invention may be used to accurately measure both single and multiple pulse injections.

Referring now in greater detail to the drawings in which like numerals indicate like items throughout the several views, FIGS. 1-8 depict the present apparatus and method of quantifying an injection event including both multiple pulse and single pulse injection events, in the various embodiments of the present invention.

Figure 1:
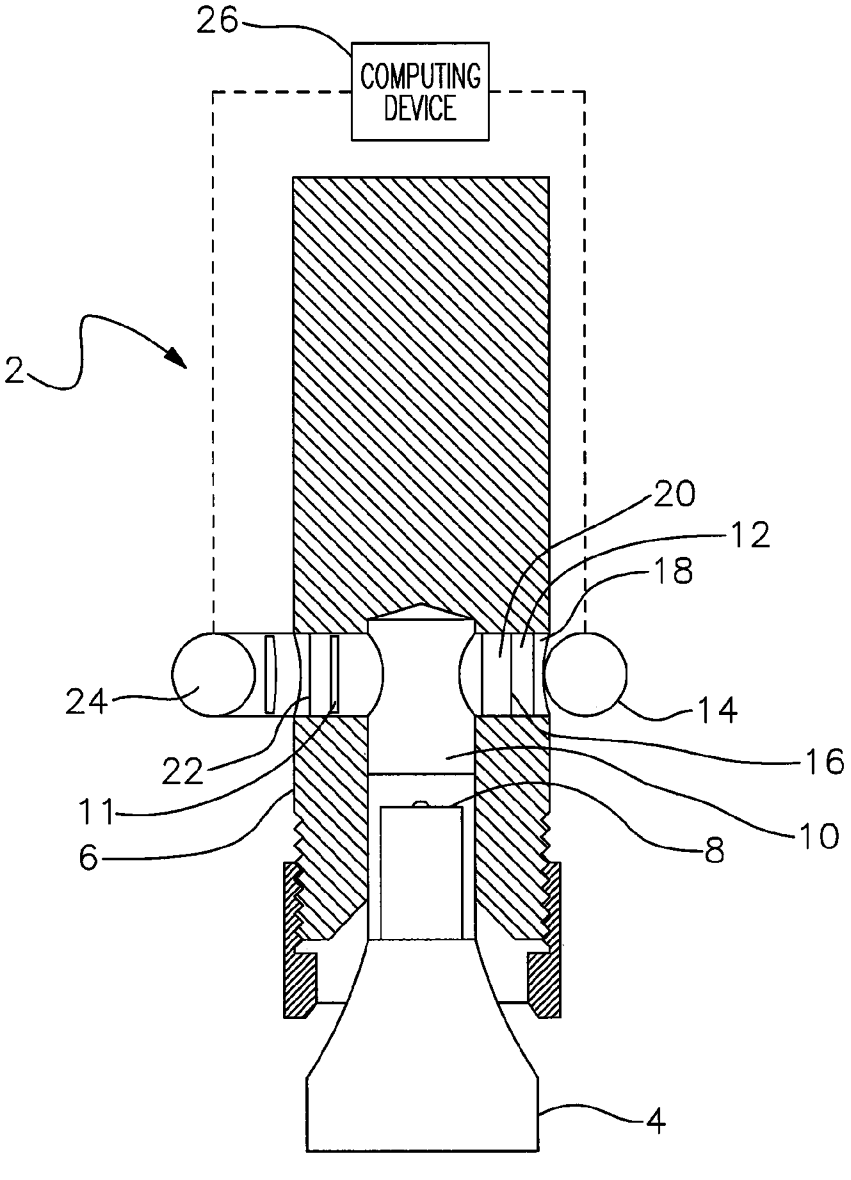
FIG. 1 is a schematic illustration of the present apparatus for testing a fuel injector in accordance with one embodiment of the present invention.

FIG. 1 illustrates the present apparatus for testing fuel injectors. Illustrated within the figure is a fixture assembly 6 capable of receiving a fuel injector 4. The fixture assembly 6 includes an opening sized to fit a fuel injector 4 to be tested. The fuel injector 4 is inserted into the receiving opening of the fixture assembly and secured within the fixture assembly 6. The fuel injector 4 may be operable to provide a single pulse injection, or to provide a multi-pulse injection. The fuel injector 4 may be fluidly connected to a fuel supply (not shown) for providing pressurized fuel to the fuel injector 4.

While fuel is described as being provided, it is contemplated by the Applicant the term "fuel" includes any liquid which can be injected via the spray tips of the injector 4.

An embodiment of the spray chamber 10 is illustrated in FIG. 1 showing the spray tip 8 of the injector 4 fitted within the spray chamber 10. As shown in FIG. 1 the spray chamber 10 is formed from a cavity created within the fixture assembly 6. However, the spray chamber 10 may have various configurations and dimensions.

Fluidly connected to the spray chamber 10 is a pressure chamber 12 housing a pressure sensor 14. The pressure sensor 14 is adapted to measure the pressure changes of the fuel or liquid within the pressure chamber 12 to provide a pressure output, e.g. output signal. The pressure changes correspond to the amount of fuel injected by the fuel injector 4, and thus, is correlated to the rate shape peak of the injection when the injector is actuated. The pressure within the pressure chamber 12 corresponds to the pressure within the spray chamber.

An isolating orifice 16 regulates and isolates the flow of fluid from the spray chamber to the pressure chamber to greatly reduce noise when detecting a pressure reading. The isolating orifice 16 may be a fixed orifice or a variable orifice. Such noise is typically caused by the swirling pressure waves and reflections associated with the injection event. In greater detail the isolating orifice 16 may be a metering valve provided for regulating and restricting the flow of fluid from the spray chamber 10. The metering valve may be a needle valve used to restrict the flow of the injected liquid between the spray chamber 10 and the pressure chamber 12. The isolating orifice 16 is fluidly connected to both the spray chamber 10 and the pressure chamber 12.

Additionally, as shown in FIG. 1 the apparatus 2 may include a bleed valve 18 for allowing air to be purged from the apparatus 2 or pressure chamber 12 before measurement begins. Furthermore, a valve assembly 20 fluidly connected to the spray chamber and pressure chamber 12 for closing the pressure chamber 12 to the spray chamber 10 can be included.

A flow meter 24 is included within the present apparatus 2 which is fluidly connected to the spray chamber 10. The flow meter 24 is adapted to measure the flow of liquid dispersed by the spray tip 8 of the injector 4 during an injection event. The flow meter 24 may be for example a highly accurate electronic positive displacement flow meter. Of course the present apparatus is not limited by any one type of flow meter.

Additionally included in an embodiment is a valve assembly 22 as shown in FIG. 1 is fluidly connected to both the flow meter 24 and the spray chamber 10. The valve assembly 22 may be for example an adjustable metering valve with a position sensing stepper motor attached for automation positioning.

In an additional embodiment, a dampener 23 is included for dampening the flow fluctuations to the flow meter 24. The dampener 23 is placed before and is in fluid communication with the flow meter 24 so as to dampen such flow fluctuations. In an embodiment, the working dampening of the dampener 23 is about 15 times less than the natural resonator frequency is about 130 Hz in an embodiment. Thus, 15 times less than the natural resonator frequency works out to be about less than 10 Hz, (130/15=8.6 Hz). In one embodiment the dampener 23 may be a small low pressure gas in elastomer bladder type pulsation damper. Of course other types of dampeners 23 may be used in conjunction with the present apparatus 2 such as spring/bellows dampers and the like.

A computing device 26 is further illustrated for receiving input from the sensors for providing injection information quantifying the injection event and resulting pulses. The computing device 26 stores the various outputs from the pressure sensor 14, the flow meter 24, the optical pickup or diode detector 30 which is illustrated in FIGS. 2, 4, and 5 additional sensors which may be included with the present apparatus 2. Example additional sensors include those providing temperature readings 11 and current probes.

After a predetermined number of consecutive injection events are measured and stored, the computing device 26 may average the injection flow measured by the flow meter 24 with the pressure 14 output. In this regard, the computing device 26 may be provided with a software program therein for performing and/or facilitating such computations. Corrections to the calculated values may be made to compensate for back pressure, temperature, and viscosity of the fuel, to obtain the desired injection information.

A further embodiment includes combining the flow meter 24 output, pressure sensor 14 output and the output acquired from the optical pickup or diode detector 30 which determines the start and stop times for the injection event. By combining the above, the present apparatus is able to achieve in an embodiment a resolution of about 1 to 10 micro seconds. Also contemplated are resolutions of less than 1 micro seconds.

As shown in FIG. 3 there is depicted overlapping multiple injection pulses and the differentiation of the pulses resulting in the extremely fine resolution discussed about. Using only the injector pressure waveform (as shown as a solid line), the start of injection or valve opening of the $2^{nd}$ and $3^{rd}$ pulses are not discernable. By combining the pressure waveform with the optical sensor waveform (as shown in broken lines), the precise location of valve activation (opening) coincides with the positive going edge of the optical sensor waveform. The slanted extrapolation line, as shown in FIG. 3, rising from the start of injection time (broken line, as determined by the optical pickup sensor or diode detector sensor waveform) up to the peak of the injection pressure (solid line, as determined by the injector pressure waveform) may be used to extrapolate the rising pressure waveform which can be used to calculate volumetric flow rates represented by the area under the resulting curve.

Illustrated in FIGS. 2 and 4 are various embodiments of the present apparatus 2 optically measuring the start and stop times of injection using the opaque properties of cavitation. The injection event creates cavitation within the spray chamber 10 as the liquid exits the spray holes of the spray tip 8. The start and stop times of injection can be determined by the presence and then absence of cavitation respectively.

Cavitation detection may be further enhanced by adding backpressure to the spray chamber 10 of up to about 1.5 to 3 percent of the injector pressure, or in an alternative embodiment about 2 percent. Thus, for example if the injector pressure is 1000 psi the back pressure could be about 20 psi. Backpressure essentially "sharpens" or focuses the cavitation spray plume. If too much back pressure is added the cavitation plume will dissipate.

Reflected/Scattered Laser Beam Light Detection Indicating Cavitation

In the embodiment illustrated in FIGS. 2 and 6 the beam produced by the laser 32 is reflected/scattered off of the cavitation plume and is detected by the optical pickup or diode detector 30. Within the present specification the terms "optical pickup" and "diode detector" are used interchangeably and the use of either term is meant to encompass the other. Furthermore the term "reflected/scattered" is used to indicate a laser beam light being reflected from a plume to the position optical pickup 30. Additionally, the use of terms "laser light" and "laser beam light" are used interchangeably and the use of either term is meant to encompass the other.

When the optical pickup or diode detector 30 acquires the reflected laser beam light the injection is said to begin and when the reflected/scattered laser beam light is no longer detected the injection is said to be finished. In a multi-pulse injection event each pulse is recorded separately as having a start and stop time of injection. By measuring such multi-pulse injections optically the present apparatus 2 is capable of preventing the superimposing or overlapping of start of injection peaks or injection curves as illustrated by separate peaks in the graph of FIG. 3.

Further illustrated in FIG. 7 is a similar embodiment to FIGS. 2 and 6 wherein a fiber optic is used to direct and retrieve a light. The fiber optic comprises a first portion 38 and a second portion 40. The term "portion" is used within the present specification to include two separate fiber optic strands wherein each portion is a separate optic fiber. The first portion 38 is operatively connected to the laser 32 and the second portion 40 is connected to the optical pickup or diode detector 30. The first portion 38 extends into the spray chamber 10. The second portion 40 extends into the spray chamber 10 and is operatively aligned to receive a reflected light source emitting from the spray plume. The second portion 40 is connected to an optical pickup or diode detector 30.

Reduced Intensity Laser Beam Light Detection Indicating Cavitation

The embodiment in FIGS. 4 and 5 depict the determination of cavitation by the partial absence of detected laser light. Partial absence of laser light is defined within an embodiment as the partial blocking or interrupting of the laser beam which reduces the intensity of the beam transmitted into the spray chamber cavity. Within this embodiment the spray chamber has a first 34 and second 36 port having a window. Of course the number of viewing ports may be more than two. The laser beam is generated by the laser 32 and is directed to the first port and through the spray chamber 10 and out the second port 36 where it is detected by the optical pickup or diode detector 30 which is operatively aligned with the laser beam.

The beam passes through the position which the cavitation plume's path would take within the spray chamber 10. When the cavitation plume is present, the transmitted laser beam intersects the plume and is partially blocked or interrupted by the opaque cavitation plume and the optical pickup or diode detector 30 detects a reduced intensity of the laser beam to indicate the start of injection. Cavitation is not present within the spray chamber 10 when an intensity increase in the laser beam is detected by the optical pickup or diode detector 30. Thus, the start time of injection occurs when a partially blocked or interrupted laser beam is detected (reduction of intensity) by the optical pickup or diode detector 30 and the end time is set when the beam returns to static intensity as detected by the optical pickup or diode detector 30.

Further illustrated in FIG. 8 is a similar embodiment to FIGS. 4 and 5 wherein a fiber optic is used to direct and pickup a light. The fiber optic comprises a first portion 38 and a second portion 40. The first portion 38 is operatively connected to the laser 32 and the second portion 40 is connected to the optical pickup or diode detector 30. The first portion 38 extends into the spray chamber 10. The second portion 40 extends into the spray chamber 10 and is operatively aligned with the first portion 38 as to receive a light source emitting from the first portion 38.

The second portion 40 extending into the spray chamber such that a gap 44 is formed between the first 38 and second 40 portion within the spray chamber 10. The gap 44 intersects the plume path 42, such that when the cavitation plume is present, the transmitted light intersects the plume and is partially blocked or interrupted by the opaque cavitation plume. Cavitation is not present within the spray chamber 10 when an intensity increase in the light is detected by the optical pickup or diode detector 30. The start time of injection is determined when the plume partially blocks or interrupts the light transferred between the first 38 and second 40 at the gap 44. The end time is set when the light intensity is increased between the gap 44 and detected by the optical pickup or diode detector 30 connected to the second portion 40 of the optic fiber.

Calibration Mode

A further embodiment includes the splitting of a single laser beam into two segments for calibrating the apparatus. A first split laser beam is directed to bypass the cavitation plume to provide a reference beam and a second split beam is directed towards the cavitation plume path. The calibration mode may be combined with any of the laser embodiments describer herein.

Method of Quantifying the Amount of Fuel Injected by a Fuel Injector

In addition, it should be evident from the discussion above the present invention also provides a method of quantifying the amount of fuel injected by a fuel injector. The method includes securing a fuel injector to a fixture assembly for capturing fuel injected by the fuel injector and actuating the fuel injector to create a fuel injection event. The flow of fuel into the pressure chamber from the spray chamber is restricted and isolated to reduce pressure waves and reflections in acquiring a pressure reading. The method further includes measuring the flow or quantity of fuel injected. Finally, injection information is determined based upon the measured pressure and measured flow. In a further embodiment the temperature is detected and used in determining the injection information.

The method may also include optically determining the start and end times of injection by detecting cavitation within the spray chamber. Cavitation is determined by detecting either the presence or partial absence of laser light. The presence of laser light is the detection of laser beam light reflected or scattered off of a cavitation plume. The partial absence of laser beam light indicates the lowered intensity of the laser beam caused by the partial blocking of the laser beam light by the cavitation plume. The start and stop times of injection determined optically provide a greater resolution in determining the dwell time between injections in the graph illustrated in FIG. 3.

As described, the determined injection information may include fuel injection quantity, variation, start and stop times for injection as determined optically and/or peaks of the rate shape. In this regard, the changes in the measured pressure are indicative of the rate peak curves of the injection event. The method may include calculating an area under a rate peak curve for the injection event based on the measured pressure changes, and determining variations in the area under the peaks of different injection events to determine variations in injection quantity. Additionally, the resolution of the different peaks, especially in a multi-pulse injection event can be increased using the start and stop times of injection determined optically.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. An apparatus for testing a fuel injector comprising:

a fixture assembly having an injector receiving opening sized to receive a fuel injector therein;

a spray chamber connected to the fixture assembly and sized to receive a nozzle tip portion of the injector, whereby the spray chamber receives fluid injected by the injector during an injection event when the injector is actuated;

a pressure chamber fluidly connected to the spray chamber and housing a pressure sensor;

an isolating orifice fluidly connected to both the spray chamber and the pressure chamber isolating the flow of injected liquid between the spray chamber and the pressure chamber, whereby pressure waves and reflections are greatly reduced within the pressure chamber for reducing noise in the recording of a pressure reading by the pressure sensor; and a flow meter fluidly connected to the spray chamber measuring a flow of the injected fluid.

2. The apparatus for testing a fuel injector of claim 1, further including a bleed valve allowing air to be purged from the pressure chamber.

3. The apparatus for testing a fuel injector of claim 1, further including a valve assembly fluidly connected to the spray chamber and pressure chamber for closing the pressure chamber to the spray chamber.

4. The apparatus for testing a fuel injector of claim 1, further including a temperature sensor.

5. The apparatus for testing a fuel injector of claim 1, further including a dampener fluidly connected to the flow meter for dampening flow fluctuations to the flow meter.

6. The apparatus for testing a fuel injector of claim 1, wherein injection event is a multiple pulse injection.

7. The apparatus for testing a fuel injector of claim 1, wherein the spray chamber further includes a view port having a window and a laser operatively aligned to direct a beam through the window and an optical pickup.

8. The apparatus for testing a fuel injector of claim 7, wherein the optical pickup is operatively aligned to receive a reflected beam of laser light generated by the laser, whereby cavitation can be detected within the spray chamber indicating the injection event upon the reception of the reflected beam of laser light.

9. The apparatus for testing a fuel injector of claim 7, wherein the optical pickup is operatively aligned to receive a beam of laser light generated by the laser as the beam passes through the spray chamber filled with the liquid, whereby cavitation can be detected within the spray chamber indicating the injection event upon the lowered intensity of a detected laser beam by the optical pickup and ending of such an event by detecting the substantially increased intensity of the laser beam.

10. The apparatus for testing a fuel injector of claim 7, further including a computing device electronically connected to the flow meter, pressure sensor and the optical pickup.

11. An apparatus for testing a fuel injector comprising:

a fixture assembly having an injector receiving opening sized to receive a fuel injector therein;

a spray chamber connected to the fixture assembly and sized to receive a nozzle tip portion of the injector, the spray chamber further including a view port, whereby the spray chamber receives fluid injected by the injector during an injection event when the injector is actuated;

a pressure chamber fluidly connected to the spray chamber and housing a pressure sensor;

an isolating orifice fluidly connected to both the spray chamber and the pressure chamber isolating and restricting the flow of injected liquid between the spray chamber and the pressure chamber, whereby pressure waves and reflections are greatly reduced within the pressure chamber for reducing noise in the recording of a pressure reading by the pressure sensor;

a flow meter fluidly connected to the spray chamber measuring a flow of the injected fluid;

a laser operatively aligned to direct a beam through the view port; and an optical pickup operatively aligned to receive a beam of laser light generated by the laser.

12. The apparatus for testing a fuel injector of claim 11, wherein the view port includes a quartz window.

13. The apparatus for testing a fuel injector of claim 11, wherein the optical pickup is operatively aligned to receive a reflected beam of laser light generated by the laser, whereby cavitation can be detected within the spray chamber indicating the injection event upon the reception of the reflected/scattered beam of laser beam light.

14. The apparatus for testing a fuel injector of claim 11, wherein the optical pickup is operatively aligned to receive a beam of laser light generated by the laser as the beam passes through the spray chamber filled with the liquid, whereby cavitation can be detected within the spray chamber indicating the injection event upon the reduced intensity of the detected laser beam by the optical pickup.

15. The apparatus for testing a fuel injector of claim 11, further including a temperature sensor.

16. The apparatus for testing a fuel injector of claim 11, further including a computing device electronically connected to the flow meter, pressure sensor and the optical pickup.

17. The apparatus for testing a fuel injector of claim 11, further including a dampener fluidly connected to the flow meter for dampening flow fluctuations to the flow meter.

18. The apparatus for testing a fuel injector of claim 11, further including a beam splitter for splitting the laser beam into a first split laser beam and a second split laser wherein the first split laser beam is directed into the path of the plume and the split second laser is directed out of the path of the plume for calibration.

19. The apparatus for testing a fuel injector of claim 11, further including an optical fiber having a first portion extending into the spray chamber and optically aligned with a second portion of the optical fiber, a gap formed between the intersection of the first and second portion of the optical fiber within the spray chamber, wherein the gap intersects a spray plume path, first portion of the optical fiber connected to a light generation apparatus and the second portion connected to an optical pickup.

20. The apparatus for testing a fuel injector of claim 11, further including an optical fiber having a first portion extending into the spray chamber and directed towards spray plume path and a second portion of the optical fiber to optically aligned to receive a reflected light from the spray plume path, first portion of the optical fiber connected to a light generation apparatus and the second portion connected to an optical pickup.

21. A method of measuring an amount of fuel injected by a fuel injector comprising the steps of:

securing a fuel injector to a fixture assembly for capturing fuel injected by the fuel injector;

actuating the fuel injector to create fuel injection event into a spray chamber;

isolating the flow of the fuel resulting from the injection event flowing into a pressure chamber, whereby pressure waves and reflections are greatly reduced within the pressure chamber by restricting the flow into the pressure chamber;

measuring the pressure of the fuel restricted into the pressure chamber;

measuring the flow of fuel from the injector during the injection event;

determining the start of injection and end of injection by detecting cavitation within the spray chamber; and determining injection information regarding the injection event based upon the measured pressure and measured flow.

22. The method of claim 21, further including purging air prior to measuring the pressure of the fuel injected.

23. The method of claim 21, further including introducing a back pressure into the spray chamber whereby the resolution of the spray plume is sharpened.

24. The method of claim 21, wherein the cavitation is determined by detecting a reflected/scattered laser beam light.

25. The method of claim 21, wherein the cavitation is determined by detecting a reduced intensity of the detected laser beam light.

26. The method of claim 21, further including splitting a laser beam into a first laser beam and a second split laser beam wherein the first split laser beam is directed into the path of the plume and the split second laser is directed out of the path of the plume for calibration.

* * * * *